United States Patent [19]

Astroth et al.

[11] Patent Number: 4,461,470

[45] Date of Patent: Jul. 24, 1984

[54] SYSTEM FOR ADDING REALISM TO VIDEO DISPLAY

[75] Inventors: Gary D. Astroth, St. Louis; Allen F. Miller, St. Peters, both of Mo.

[73] Assignee: Mark E. Astroth, St. Louis, Mo.

[21] Appl. No.: 505,876

[22] Filed: Jun. 20, 1983

[51] Int. Cl.³ .................... A63G 31/02; A63G 31/16
[52] U.S. Cl. .................................. 272/17; 272/1 C; 273/85 G; 434/43; 434/57
[58] Field of Search .................. 434/43, 55, 56, 57, 434/58, 51; 272/1 C, 17, 18; 273/85 G

[56] References Cited

U.S. PATENT DOCUMENTS

| | | | |
|---|---|---|---|
| 2,373,653 | 4/1945 | Barber | 434/56 |
| 2,409,938 | 10/1946 | Hutter | 272/1 C |
| 2,524,238 | 10/1950 | Soule | 272/1 C |
| 2,661,954 | 12/1953 | Koci | 272/1 C X |
| 2,695,783 | 11/1954 | Serafin | 272/1 C X |
| 2,935,316 | 5/1960 | Bradstreet | 272/17 |
| 3,173,686 | 3/1965 | Rettie et al. | 272/17 |
| 4,418,911 | 12/1983 | Bowers et al. | 272/1 C X |

Primary Examiner—William H. Grieb
Attorney, Agent, or Firm—Rogers, Eilers & Howell

[57] ABSTRACT

A video controlling and viewing system has a tiltable platform which supports a chair in spaced relation to a console that has a video screen; and a user seated on that chair can manipulate the control element of that console to simultaneously (a) move the views on the video screen up and down and also rotate them in the clockwise or counterclockwise direction and (b) tilt the platform oppositely of the movement of the views on that video screen. The programming means for the console is independent of the driving means for the platform to some extent but the control element of the console will cause the view on the screen to shift in one direction while the platform is tilted in the opposite direction. Cables, drums and motors are used to tilt the platform while views are being displayed on the video screen, and they automatically return the platform to a "home" position at the conclusion of the displaying of those views. That platform is then locked in position until it is unlocked when a further sequence of views is to be displayed on the video screen.

25 Claims, 11 Drawing Figures

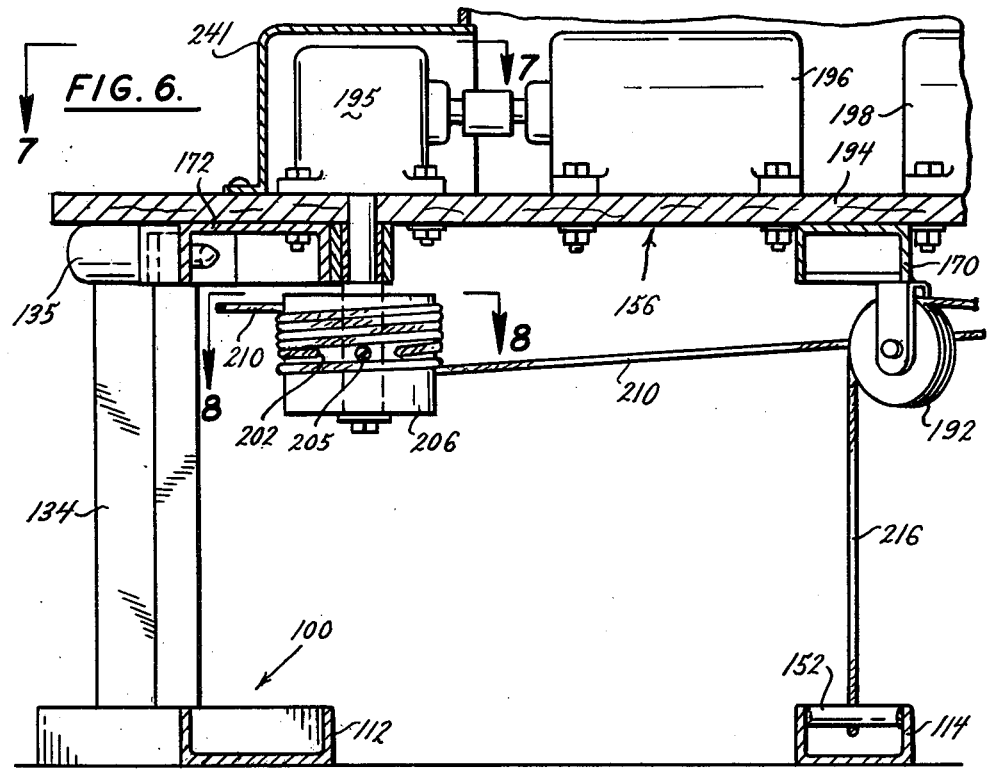
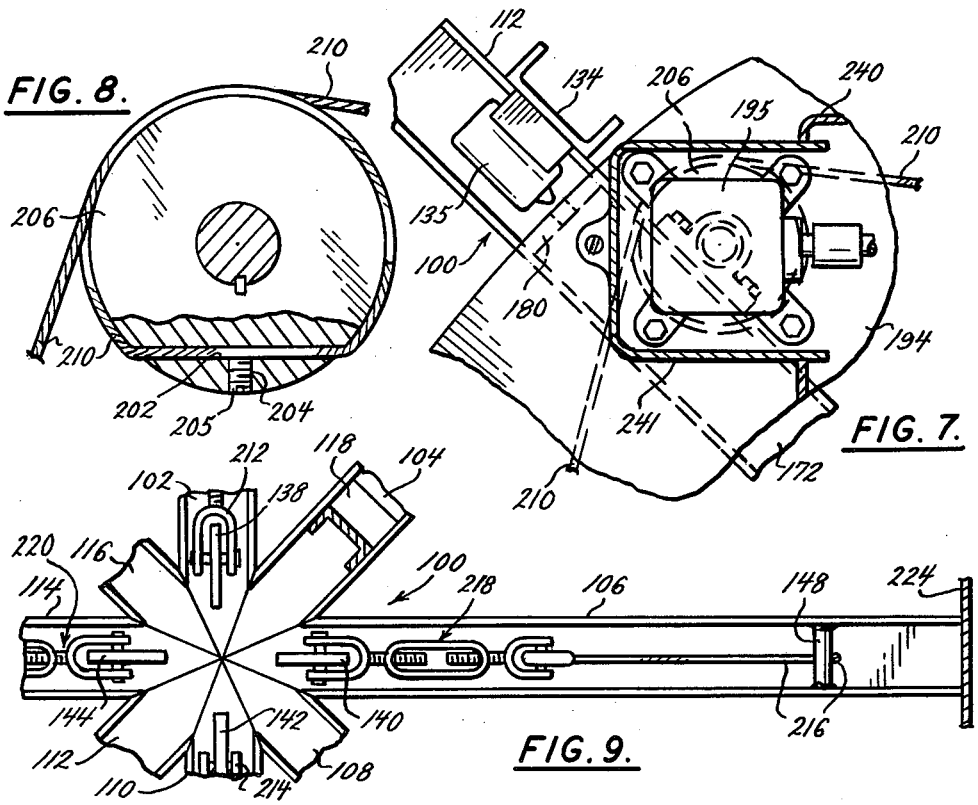

SYSTEM FOR ADDING REALISM TO VIDEO DISPLAY

BRIEF SUMMARY OF THE INVENTION

The system of the present invention has a platform that supports a console which displays a predetermined but variable sequence of views on a video screen and also supports a chair in confronting relation to that screen. That platform is tiltable along a fore-aft axis and also is tiltable along a port-starboard axis which is displaced ninety degrees from the fore-aft axis. Further, that platform is tiltable along each of those axes at the same time so that platform can assume an infinite number of positions relative to the screen. A programming means causes the views to be displayed on the screen in the predetermined but variable sequence, a driving means moves the platform into and out of its various tilted positions, and a control means can selectively cause the driving means to shift any or all of the views relative to the screen and also can selectively cause the driving means to tilt the platform relative to the screen. The programming means is independent of the control means and of the driving means to the extent that the programming means will cause the predetermined but variable sequence of views to be displayed on the screen irrespective of any and all actions of the control means and of the driving means, but is related to the control means to the extent that any or all views of the predetermined but variable sequence of views on the screen can be moved relative to that screen. The control means and the driving means are independent of the programming means to the extent that neither the control means nor the driving means need be actuated to effect the display on the screen of the predetermined but variable sequence of views, but are related to the programming means to the extent that actuation of the control means and of the driving means can produce movements of the platform relative to the screen and can produce movements, of any or all of the views of the predetermined but variable sequence of views on the screen, whereby a sense of realism is added to the viewing of the predetermined but variable sequence of views on the screen. It is, therefore, an object of the present invention to provide a tiltable platform which supports a console with a video screen and also supports a chair in confronting relation to that screen, to provide a programming means which causes a predetermined but variable sequence of views to be displayed on the screen, to provide a driving means to move the platform into and out of various tilted positions, to provide a control means which can selectively cause the programming means to shift any or all of the views relative to the screen and also can selectively cause the driving means to tilt the platform relative to the screen, to make the programming means independent of the control means and of the driving means to the extent that the programming means will cause the predetermined but variable sequence of views to be displayed on the screen irrespective of any and all actions of the control means and of the driving means but to relate the programming means to the control means to the extent that any or all views of the predetermined but variable sequence of views on the screen can be moved relative to that screen, and to make the control means and the driving means independent of the programming means to the extent that neither the control means nor the driving means need be actuated to effect the display on the screen of the predetermined but variable sequence of views but to relate the control means and the driving means to the programming means to the extent that actuation of the control means and of the driving means can produce movements of the platform relative to the screen and can produce movements of any or all of the views of the predetermined but variable sequence of views on the screen which will add a sense of realism to the viewing of the predetermined but variable sequence of views on the screen.

The control means is so related to the programming means and to the driving means that whenever that control means causes a view on the screen to move upwardly it will cause the fore portion of the platform to move downwardly, and vice versa. Also, that control means is so related to the programming means and to the driving means that whenever that control means causes a view on the screen to tilt in the clockwise direction it will cause the platform to tilt in the counterclockwise direction, and vice versa. In that way, the system of the present invention provides a desirably large, properly oriented relative movement of the platform and of the views on the screen while giving the user the impression that the movement of the view on the screen is due to the movement of the platform, thereby providing a desirable sense of realism to the view of the predetermined but variable sequence of views on the screen. It is, therefore, an object of the present invention to provide a console with a screen on which a predetermined but variable sequence of views can be displayed, with a platform which is movable relative to those views, and with a controlling means which can simultaneously cause a view on the screen to move upwardly and the fore portion of the platform to move downwardly, and vice versa, and can simultaneously cause a view on the screen to tilt in the clockwise direction and the platform to tilt in the counterclockwise direction, and vice versa.

The control element on the console moves the actuators for a pair of controls—usually potentiometers. One of those controls determines the extent to which the view on the console screen moves upwardly or downwardly while the other of those controls determines the extent to which that view tilts in the clockwise or counterclockwise direction. The present invention mounts a further control adjacent the control which determines the vertical position of the view on the console screen, and it couples the movable contacts of those controls so they can be moved simultaneously by the control element of the console. Also, a still further control is mounted adjacent the control which determines the tilting of that view, and it couples the movable contacts of those controls so they can be moved simultaneously by the control element of the console. However, the further control is oriented so the fore portion of the platform will move downwardly when the view on the console screen moves upwardly, and vice versa; and the still further control is oriented so the platform will tilt in the counterclockwise direction as the view on the console screen is tilted in the clockwise direction, and vice versa. In this way, a viewer of a predetermined but variable sequence of views on a console screen, who is accustomed to manipulating the control element of that console, is not required to manipulate any additional control element and is not required to re-learn how to operate that control element. It is, therefore, an object of the present invention to provide a console with a screen on which a predetermined but variable sequence of views can be displayed, to provide a platform which is tiltable relative to those views, to mount the controls for the platform immediately adjacent the controls which determine the positioning of the views on the console screen, and to interrelate those controls so movement of the control element of the console will simultaneously actuate the controls for the view on the console screen and the controls for the platform.

The system provided by the present invention has a stationary base which underlies and supports a platform while permitting that platform to tilt along two axes that are spaced apart ninety degrees. Cables, which are very strong but which are very flexible, interconnect that platform with that base; and those cables respond to motor-driven drums to effect the desired tilting of the platform along the two axes. Those cables make the system light in weight, quickly responsive, and essentially maintenance-free. Also, by using flexible cables, rather than hydraulic cylinders, to move the platform of the system, the present invention eliminates the semi-annual or oftener maintenance required for hydraulic systems that are used to move platforms. Further, by using flexible cables rather than hydraulic cylinders to move the platform, the present invention greatly reduces the cost and mass of the system, and also reduces the magnitude of the forces which are required to overcome inertia and momentum during the operation of the system. It is, therefore, an object of the present invention to provide a stationary base, a platform which is tiltable relative to that base to tilt a console and a viewer relative to that base, cables which extend between that base and that platform, and motor-driven drums which act through those cables to tilt that platform along two axes that are spaced apart ninety degrees.

An enclosure is provided for the base and the platform; and an opening is provided in the top of that enclosure to accommodate the console and a chair which are mounted on that platform. Parts of the top of that enclosure overlie the sides of the platform to make it easy and safe for the user to step onto, and subsequently to step off of, that platform. That enclosure protects nearby persons or objects from all contact with the tiltable platform. In addition, that enclosure protects that platform from all injury which it could receive from objects being moved past that platform. It is, therefore, an object of the present invention to provide an enclosure, for a base and a tiltable platform, that has an opening in the top thereof to accommodate a console and a chair which are mounted on that platform and that has parts of that top overlying the sides of the platform to make it easy for the user to step onto, and subsequently to step off of, that platform.

The control element of the console is spring-biased for movement to a normal "home" position; and hence it will return to that normal position whenever the user releases it. The platform has a normal "home" position which corresponds to the normal position of the control element of the console; but that platform must be driven to that normal position. Moreover, that platform must be free to tilt in response to the movement of the control element of the console during the displaying of the predetermined but variable sequence of views on the console screen, and then must be driven to its normal position. The present invention enables the platform to tilt in response to movement of the control element of the console while the predetermined but variable sequence of views is being displayed on the screen of the console and thereafter drives that platform to its normal position. It is, therefore, an object of the present invention to provide a platform for a console which is free to tilt in response to movement of the control element of the console while a predetermined but variable sequence of views is being displayed on the screen of that console and thereafter drives that platform to its normal position.

Mechanical interlocks are provided between the platform and the base of the system provided by the present invention; and those interlocks prevent relative movement between that platform and base whenever the operator is stepping onto, or off of, that platform. As a result, the cable, the drums and the motors of that system are relieved of all dynamic forces which could be applied to them in the event a heavy person were to suddenly and abruptly apply all of his weight to that platform. Those mechanical interlocks are, however, automatically rendered inactive whenever the platform is to be moved. It is, therefore, an object of the present invention to provide mechanical interlocks which permit free movement of a platform relative to a base throughout the time a console on that platform is providing a predetermined but variable sequence of views on the screen of that console, but which mechanically and automatically lock that platform against movement whenever a user is stepping onto, or off of, that platform.

The program for the sequence of views to be displayed on the screen of the console will preferably be designed so the user of the system can readily initiate movements of the platform which will enhance the realism that the various views try to provide. Specifically, the program should be planned so the user has sufficient time, during each sub-sequence of views, to initiate a movement of the platform which will correspond to that sub-sequence before a further sub-sequence of views is projected onto the screen. Additionally, the movement of a view relative to the screen should not be so rapid and so extreme, so the control element of the console is moved, that the corresponding but oppositely-directed movement of the platform could not start until after all of the movement of the view had been concluded. In one preferred embodiment of the present invention, the platform moves from any of its extreme tilted positions to its horizontal "home" position in about one and one-quarter seconds; and hence the maximum vertical speed of any point on the periphery of that platform can be less than forty-three hundredths (0.43) of a foot per second. Also, the angular extent of movement of the platform from any of its extreme tilted positions to its horizontal "home" position is very substantially less than thirty degrees, and hence no user of the system should become alarmed upon movement of the platform, and no user of the system could be injured by such movement. Although the movement of a view on the console screen can be more rapid and of greater extent than the corresponding but oppositely-directed movement of the platform, the program for the predetermined but variable sequence of views to be displayed on the console screen should limit the extent and rate of relative movement of those views on that screen sufficiently to keep any movement of the platform sufficiently close in time to the movement of any given view to enable the user of the system to automatically sense that the movement of the platform was intimately related to the movement of that view on the screen. It is, therefore, an object of the present invention to provide a system wherein the speed and extent of movement of views on the screen of a console are such that the corresponding oppositelydirected movement of a platform will cause the user to automatically sense a relation between the movement of any view and the corresponding oppositely-directed movement of the platform.

The kind and sequence of views which can be provided on the console screen will be limited only by the imagination of the programmer. However, those views will usually suggest that the user of the system is seated within a vehicle which can move upwardly and downwardly and tilt from side-to-side. For example, the views could suggest that the user was sitting in an airplane, spacecraft or other vehicle which was moving through the air or through space, was sitting in a racing car, automobile, truck, tank or other ground vehicle, was sitting in or on a ship, boat, surfboard or other object moving on the surface of water, was in a submarine, diving suit or scuba unit operating under the water, or was in a mining machine operating under the ground.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing.

FIG. 6 is a sectional view, on a scale intermediate those of FIGS. 4 and 5, which is taken along a plane indicated by the line 6—6 in FIG. 1, FIG. 7 is a sectional view, on the scale of FIG. 6, which is taken along a plane indicated by the line 7—7 in FIG. 6, FIG. 8 is a sectional view, on an even larger scale, which is taken along a plane indicated by the line 8—8 in FIG. 6, FIG. 9 is a sectional view, on the scale of FIG. 3, which is taken along a plane indicated by the line 9—9 in FIG. 3.

DETAILED DESCRIPTION OF PREFERRED EMBODIMENT

Figure 1:
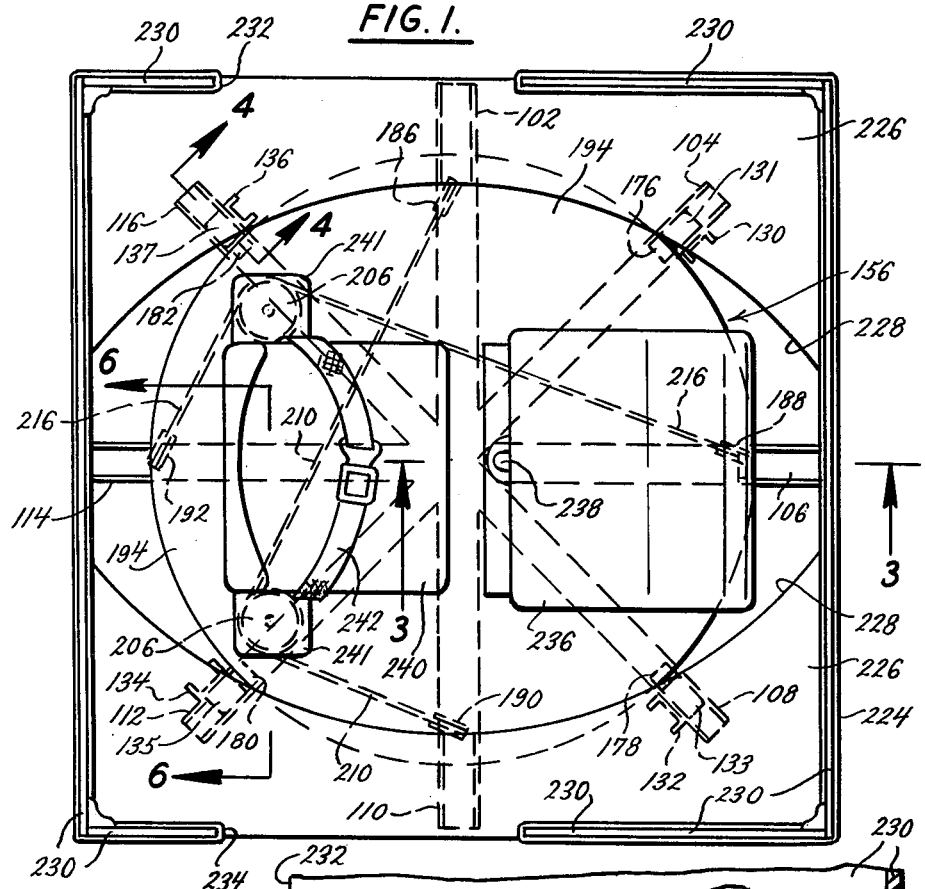
FIG. 1 is a plan view of one preferred embodiment of the present invention.

Referring to the drawing in detail, the numeral 100 generally denotes a base for the system which is provided by the present invention; and that base includes eight channels 102, 104, 106, 108, 110, 112, 114 and 116. Channels 102 and 110 are disposed in end-to-end relation to define a port-starboard axis; and channels 106 and 114 are disposed in end-to-end relation to define a fore-aft axis which is displaced ninety degrees from the port-starboard axis. Channels 104 and 112 are disposed in end-to-end relation to define an axis which is displaced forty-five degrees from each of the fore-aft and port-starboard axes; and channels 108 and 116 are disposed in end-to-end relation to define an axis which is displaced ninety degrees from the axis defined by channels 104 and 112. The inner ends of channels 102, 104, 106, 108, 110, 112, 114 and 116 are appropriately formed and then welded together.

Figure 3:
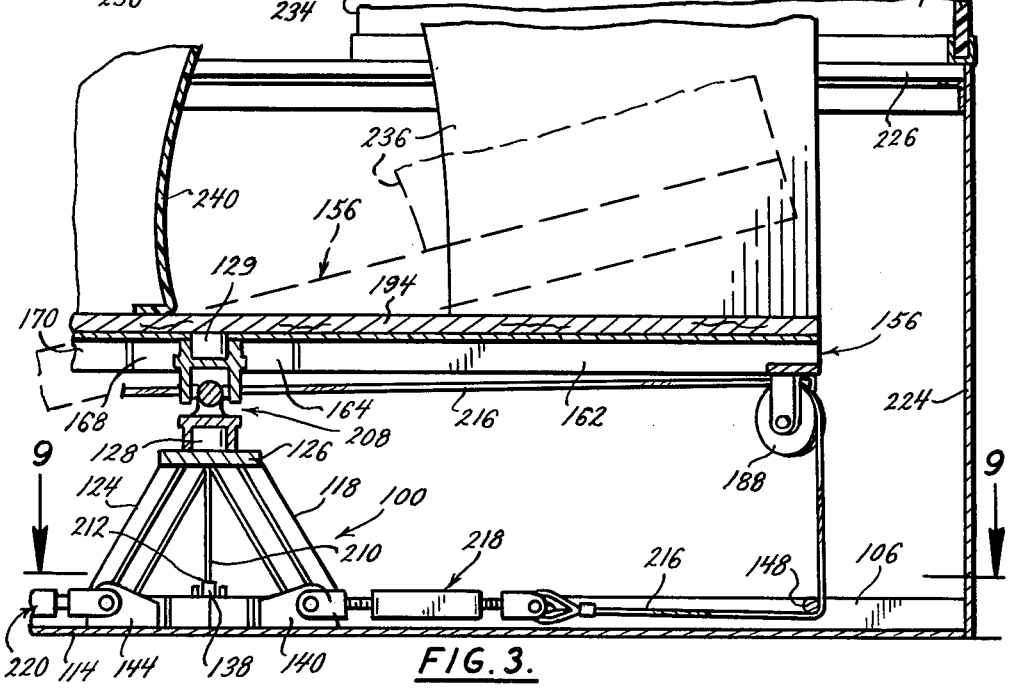
FIG. 3 is a sectional view, on a larger scale, which is taken along a plane indicated by the line 3—3 in FIG. 1.
Figure 2:
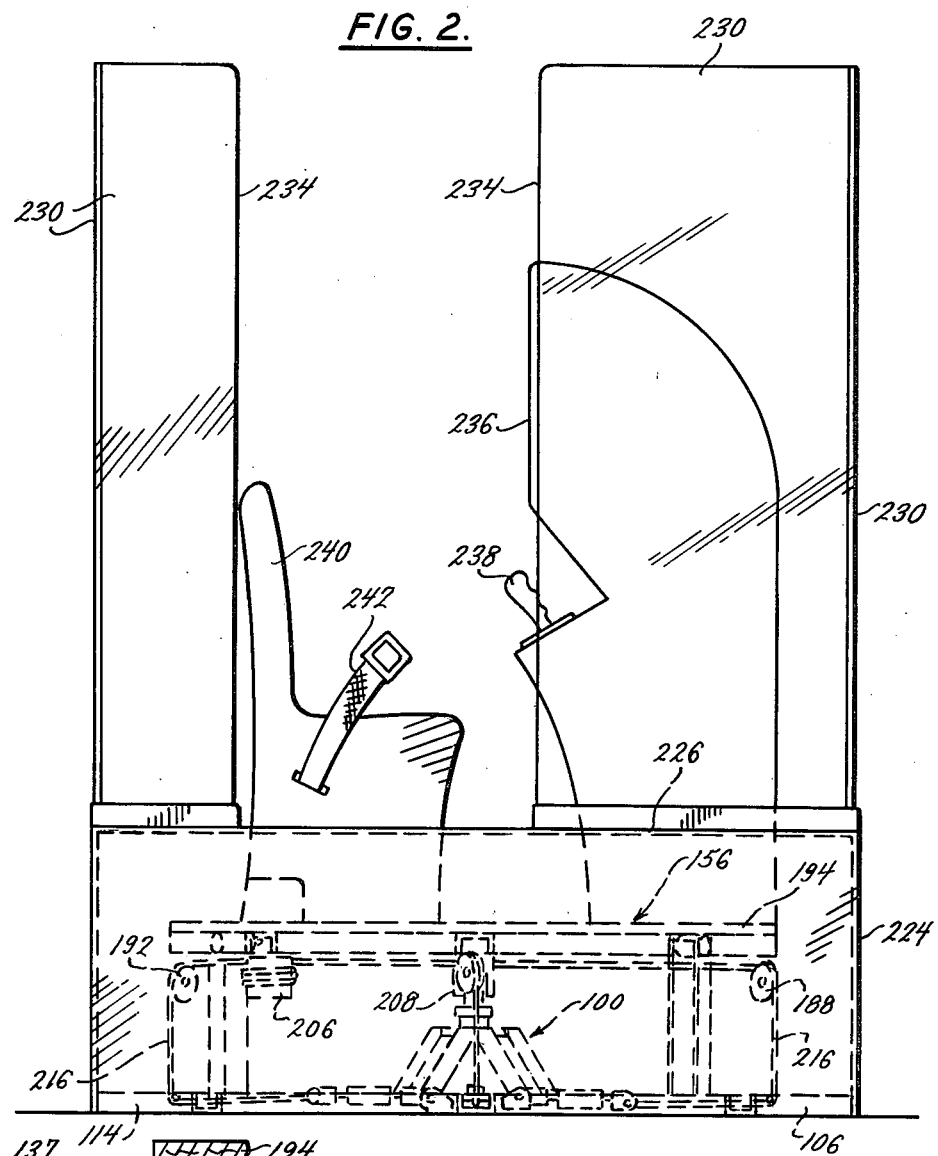
FIG. 2 is a side elevational view of that preferred embodiment.
Figure 4:
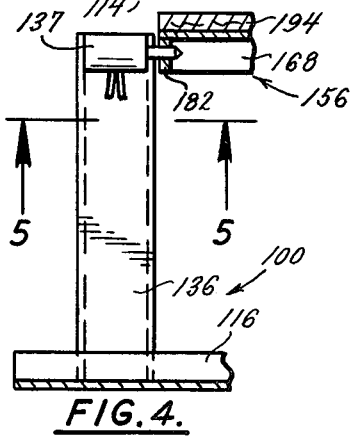
FIG. 4 is another sectional view, on the scale of FIG. 3, which is taken along a plane indicated by the line 4—4 in FIG. 1.
Figure 5:
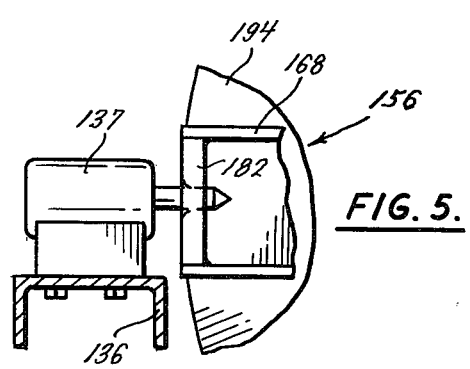
FIG. 5 is a sectional view, on a still larger scale, which is taken along a plane indicated by the line 5—5 in FIG. 4.

Four struts incline upwardly and inwardly from channels 104, 108, 112 and 116 to a plate 126; and two of those struts, namely struts 118 and 124, are shown in FIG. 3. Those struts will be fixedly secured to those channels and to that plate to fixedly hold that plate above, and parallel to, the inner ends of channels 102, 104, 106, 108, 110, 112, 114, and 116. A sturdy stub shaft 128 is secured to, and projects upwardly from, the plate 126.

A post 130, which is shown as a channel, is fixedly secured to and extends vertically upward from one of the flanges of the channel 104; and that post is secured a short distance inwardly from the outer end of that channel. Similarly-oriented posts 132, 134 and 136 are secured, respectively, to the flanges of channels 108, 112 and 116, and are spaced short distances inwardly from adjacent the outer ends of those channels. A solenoid 131 is mounted on the post 130 so the plunger thereof is coaxial with channels 104 and 112. A solenoid 133 is mounted on the post 132 so the plunger thereof is coaxial with channels 108 and 116. A solenoid 135 is mounted on post 134 so the plunger thereof is coaxial with channels 104 and 112; and a solenoid 137 is mounted on the post 136 so the plunger thereof is coaxial with channels 108 and 116.

Four brackets 138, 140, 142 and 144 have openings therein; and the bottoms of those brackets are secured, respectively, to inner portions of channels 102, 106, 110 and 114, as shown by FIG. 9. A short rod 148 of circular cross section is fixedly secured between the flanges of channel 106 adjacent the outer end of that channel. Similar short rods are secured between the flanges of channels 102, 110 and 114 adjacent the outer ends of those channels; and one of those rods, namely, the rod 152 is shown in FIG. 6.

Referring particularly to FIGS. 3 and 6, the numeral 156 generally denotes a platform which includes eight channels that have center-to-center spacings of forty-five degrees; and five of those channels, namely channels 162, 164, 168, 170 and 172, are shown in one or more of FIGS. 3–7. The eight channels of the platform are in register with, but are shorter than, the channels of base 100; so the diameter of that platform is only four feet whereas the combined lengths of channels 102 and 110, or of channels 106 and 114, are five feet. The inner ends of the eight channels of platform 156 are appropriately formed and then welded together.

The flanges of the channels of platform 156 depend downwardly from the webs of those channels; and locking brackets 176, 178, 180 and 182 are fixedly secured to the under faces of the webs of those channels which are in register with the channels 104, 108, 112 and 116 of base 100, as shown by FIG. 1. Each of those brackets has a hole therein; and those holes are dimensioned to accommodate the plungers of solenoids 131, 133, 135 and 137.

A pulley 186 is rotatably secured to, but is disposed below, the channel of platform 156 which is in register with the channel 102 of base 100. Similar pulleys 188, 190 and 192 are, respectively, rotatably secured to, but disposed below the channels of the platform which are in register with the channels 106, 110 and 114 of base 100; and FIGS. 3 and 6 show how those pulleys are secured to those channels. The pulleys 186, 188, 190 and 192 are located adjacent the periphery of platform 156; and they are disposed in general vertical registry with the rods 148 and 152, and the other two rods, not shown, of base 100.

A circular floor 194 is secured to the upper surfaces of the webs of the channels of platform 156; and that floor can be made of different materials but plywood is preferred. A motor 196 with a gear housing 195 is mounted on the floor 194 with the output shaft of that gear housing extending downwardly through that floor. A motor 198 also is mounted on the floor 194 with the output shaft of the gear housing thereof extending downwardly through that floor. The output shafts of the gear housings will be considered to be the output shafts of the motors. The motors 196 and 198 are fractional horsepower, reversible, A.C. motors.

A cylindrical drum 206 is fixedly secured to the output shaft of motor 196; and that drum is below the level of and is, in part, coextensive with the channel 172, as shown by FIGS. 6 and 7. That drum has a hole 202 passing through it; and it has a further hole 204 which is threaded to accommodate a set screw 205. A similar drum is fixedly secured to the output shaft of motor 198.

A universal joint 208 has the lower portion thereof telescoped down over, and secured to, the stub shaft 128 of base 100, as shown by FIG. 3. The upper portion of that universal joint is telescoped over a stub shaft 129 which is secured to the center of platform 156, as shown by FIG. 3. That universal joint will hold the channels of platform 156 above, and in register with, the channels of base 100 while permitting tilting of that platform along the fore-aft axis which is defined by channels 106 and 114 and also permitting tilting of that platform along the port-starboard axis which is defined by channels 102 and 110. Actually, that universal joint will permit the platform 156 to assume a limitless number of tilted positions relative to the base 100 while preventing rotation of that platform about a vertical axis. Although different universal joints could be used, a Bos-Trong UJNL Series 24-24 Item 17408 universal joint of the Boston Gear Company is preferred.

The numeral 210 denotes a cable which is passed through the hole 202 in the drum 206 before eye-socket assemblies are secured to the ends of that cable. The set screw 205 is used to solidly secure the approximate midpoint of that cable to that drum. Although different cables could be used, the 7×19 Aircraft Cord with 7000 pound breaking strength which is sold by Samsel Rope & Marine Supply Company is preferred. Further, although different eye-sockets could be secured to the ends of cable 210, the $\frac{1}{4}$ inch wire rope extra heavy duty eye-socket assemblies of Samsel Rope & Marine Supply Company is preferred. One end of cable 210 exits from one end of the hole 202, is wound around drum 206, is passed over the top of pulley 186, is directed downwardly and passed under a rod, which is similar to the rod 148 but is secured to channel 102, and then is secured to one end of a turnbuckle 212. That turnbuckle has clevis-like ends; and one of those clevis-like ends is secured to the bracket 138 while the other of those ends is secured to one of the eye-sockets on cable 210. The other end of cable 210 exits from the other end of the hole 202, is wrapped around drum 206, is passed over pulley 190, is directed downwardly and passed under a rod, which is similar to the rod 148 but which is secured to channel 110, and then is secured to one end of a turnbuckle 214. The other end of that turnbuckle is secured to the bracket 142. Although different turnbuckles could be used, a $\frac{5}{8}\times 6$ Jaw & Jaw Turnbuckle G-228 of Samsel Rope & Marine Supply Company is preferred. The turnbuckles 212 and 214 will be adjusted to provide enough tension on cable 210 to hold the platform 156 against tilting along the port-starboard axis—even when a heavy man places his weight on any portion of that platform. However, the tension on cable 210 must not be so great that it could cause binding of either of the pulleys 186 and 190 on the pivots therefor or could cause undue bearing wear in the gear housing 195.

The numeral 216 denotes a cable which is similar to the cable 210; but cable 216 passes through a hole in the drum which is driven by motor 198 and the gear housing therefor. That cable is passed through the hole in that drum, and its approximate midpoint is secured by a set screw, before eye-socket assemblies are secured to the ends of that cable. One end of cable 216 exits from the other end of the hole in the drum, is wrapped around that drum and then is passed over pulley 188 and downwardly to and below and inwardly of rod 148 to one end of a turnbuckle 218. The other end of that turnbuckle is secured to the bracket 140, as shown by FIGS. 3 and 9. The other end of cable 216 exits from the other end of the hole in the drum, is wrapped around that drum, and then is passed over pulley 192 and downwardly to and below the rod, adjacent the outer end of channel 114, to the outer end of a turnbuckle 220. The inner end of that turnbuckle is secured to the bracket 144, as shown by FIGS. 3 and 9. Those turnbuckles will be adjusted to provide sufficient tension on cable 216 to hold the platform 156 against tilting along the fore-aft axis—even when a heavy man places his weight on any portion of that platform. However, the tension on cable 216 must not be so great that it could cause binding of either of the pulleys 188 and 192 on the pivots therefor or could cause excessive bearing wear in the gear housing for motor 198.

The numeral 224 denotes a housing which has a width equal to the combined lengths of channels 102 and 110 and which has a length equal to the combined lengths of channels 106 and 114. The height of that housing is greater than the distance from the level of either of the motors 196 and 198 to the bottom of base 100. A closure 226 for the top of housing 224 has a generally eliptical opening 228 therein; and the ends of that opening extend to two of the walls of housing 224, and hence extend about one-half of a foot beyond the adjacent edge of floor 194. The sides of opening 228 are spaced apart a distance less than the diameter of floor 194, so substantial portions of the periphery of that floor are overlain by closure 226. In one preferred embodiment of the present invention, the floor 194 is disposed about eight inches below the top of closure 226 whenever the platform 156 is in its normal position.

A console 236, which is of standard and usual design and which has a video screen, is mounted on the floor 194 adjacent that portion of that floor which is close to one end of the opening 228. A chair 240 is mounted on the floor 194 adjacent the opposite end of that floor; and the bottom of that chair is formed as a shield 241 to at least partially overlie and protect the motors 196 and 198—and also to protect the user against stepping on or walking into either of those motors or the gear housings therefor. A control element 238 of standard and usual design is mounted on the console 236; and that control element will be manipulated by a user seated on the chair 240. A seat belt 242 is secured to the chair 240.

The numeral 230 denotes a transparent upward extension of the housing 224. That transparent upward extension will have the same width and length as the housing, but it will have openings 232 and 234 in the sides thereof in register with the chair 240. Those openings will permit a user to enter that enclosure, step down onto platform 156, and then sit on the chair 240, or to step up from that platform and leave that enclosure.

Figure 10:
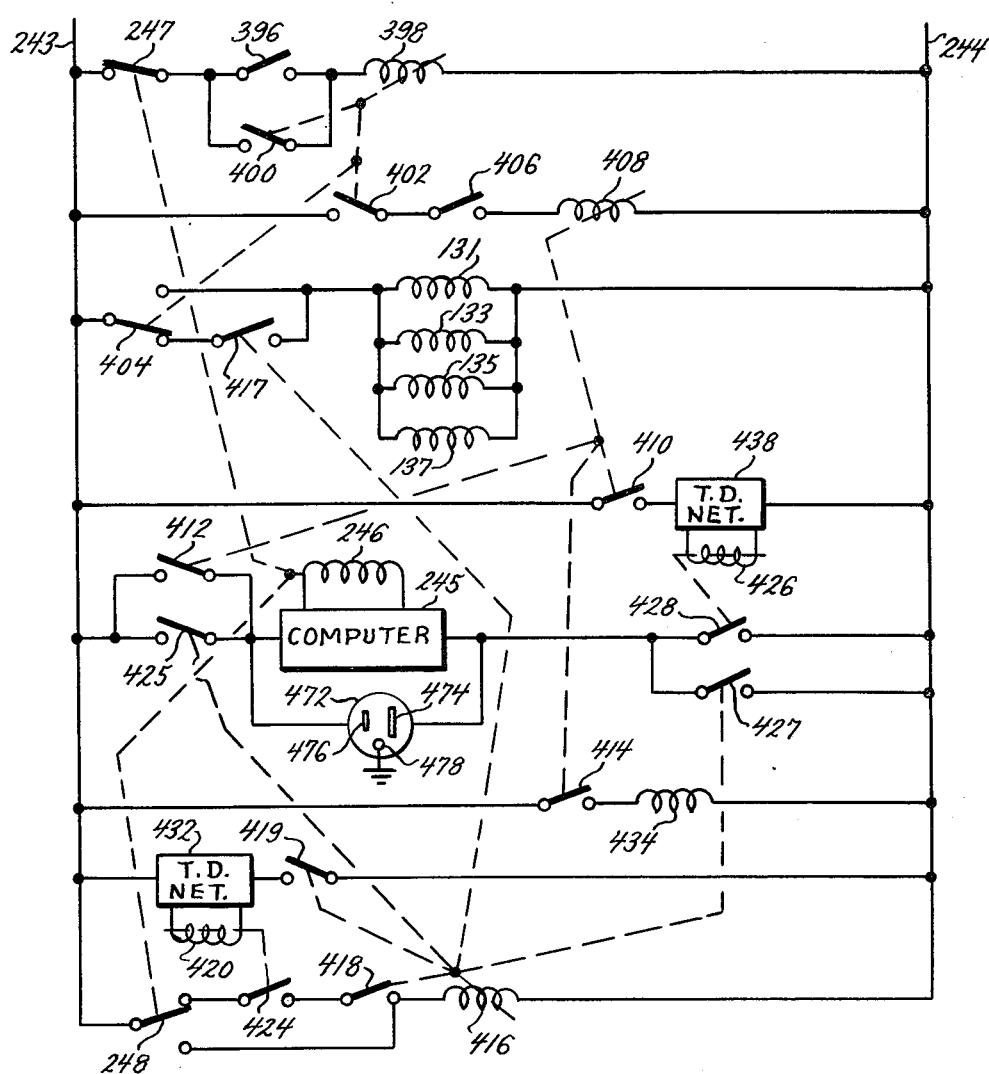
FIG. 10 is a schematic diagram of part of the circuit for the embodiment of FIGS. 1-9.

Referring particularly to FIG. 10, the numerals 243 and 244 denote conductors which are connectable, respectively, to the "hot" and neutral conductors of a source of alternating current. The numeral 245 denotes a computer of standard and usual design which is used in a device or system that causes predetermined but variable kinds and sequences of views to be displayed on the screen of the console 236; and that device or system can be one of a number of devices or systems which are popularly referred to as video games. A polarized socket 472 has a contact 474 which is engageable by a pin 274 of a plug 272 of FIG. 11, has a contact 476 which is engageable by a pin 276 of that plug, and has a contact 478 which is engageable by a pin 278 of that plug. Terminal 476 of that socket and one terminal of computer 245 are selectively connectable to conductor 243 by relay contact 412 or relay contact 425; and terminal 474 of that socket and the other terminal of that computer are selectively connectable to conductor 244 by relay contact 427 or relay contact 428.

Terminal 478 of that socket will be grounded to the metal conduit of the electrical system of a building. A relay 246 is controlled by the computer 245; and that relay will be energized whenever a view is being displayed on the screen of console 236. That relay controls relay contacts 247 and 248; and relay contacts 247 selectively connect one terminal of a relay 398 to conductor 243 via a coin actuated switch 396 or via relay contacts 400. The other terminal of relay 398 is connected to conductor 244; and that relay controls relay contacts 400, 402 and 404. The switch 396 preferably is a standard and usual coin-operated switch of the type used in coin-actuated vending machines, and it can be a coin-actuated switch or the phototransistor of an opto-coupler. That switch is not, per se, a part of the present invention; and it need only respond to an inserted coin to close momentarily and then re-open.

A relay 408 has one terminal thereof selectively connectable to conductor 243 by relay contacts 402 and a seat belt switch 406. The other terminal of that relay is directly connected to conductor 244; and that relay controls relay contacts 410, 412 and 414. Switch 406 will be open whenever the seat belt 242 is not in use; and it will be closed whenever that belt is buckled around a user who is seated on the chair 240.

The numeral 416 denotes a relay which has one terminal thereof directly connected to conductor 244; and that relay controls relay contacts 417, 418, 419 425 and 427. The other terminal of that relay is selectively connectable to conductor 243 via the movable and lower relay contacts 248 or via relay contacts 418 and 424 and the movable and upper relay contacts 248. The right-hand terminals of solenoids 131, 133, 135 and 137 are connected together and directly to conductor 244. The left-hand terminals of those solenoids are selectively connectable to conductor 243 by the movable and upper relay contacts 404 or by relay contacts 417 and the movable and lower relay contacts 404.

The numeral 438 denotes a time delay network which has one terminal thereof directly connected to conductor 244 and which has the other terminal thereof selectively connectable to conductor 243 by relay contacts 410. Whenever that network is activated, it will provide a desired time delay of about five seconds before relay 426 can be activated to close relay contacts 428; and thereafter those relay contacts will remain closed until relay contacts 410 re-open.

The numeral 432 denotes a time delay network which has the left-hand terminal thereof directly connected to conductor 243 and which has the right-hand terminal thereof selectively connectable to conductor 244 by relay contacts 419. Whenever that network is activated, it will actuate a relay 420 with consequent closing of relay contacts 424; and thereafter that network will cause that relay to keep those contacts closed for a desired time, usually between one and one-half to two seconds, and then permit those relay contacts to re-open.

Different time delay networks would be used as the time delay networks 432 and 438; but a NE 555 which is supplied with full wave rectified current has been found to be very useful. As a result, each of the time delay networks 432 and 438 preferably includes a transformer which has the terminals of the primary winding thereof serving as the input terminals of that time delay network. The secondary winding of each of those transformers has a full wave bridge rectifier and a five thousand (5000) microfarad capacitor connected in parallel across its terminals. The negative terminals of that full wave bridge rectifier and capacitor serve as the ground terminal of each time delay network, and they are connected to pin 1 of the NE 555. The positive terminals of that full wave bridge rectifier and capacitor serve as the positive terminal of the time delay network, and they are connected to pins 4 and 8 of the NE 555. One-tenth (0.1) microfarad capacitors are connected between ground and pins 2 and 5 of the NE 555. Pins 6 and 7 of each NE 555 are connected together, and a timing capacitor is connected between those pins and ground; and a timing resistor is connected between pins 7 and 8 of each NE 555. The relay 426 is connected between the ground and pin 3 of the NE 555 of time delay network 438; and the relay 420 is connected between ground and pin 3 of time delay network 432. The amount of time delay which is provided by each time delay network will be determined by calculating the values of the timing capacitor and timing resistor in accordance with a well established electrical formula.

The numeral 434 denotes a relay which has one terminal thereof directly connected to conductor 244 and which has the other terminal thereof selectively connectable to conductor 243 by relay contacts 414. That relay controls contacts 258, 259, 260 and 261 in FIG. 11; and contact 258 selectively engages contact 250 or 254, and contact 259 selectively engages contact 249 or 253. The contact 260 selectively engages contact 252 or 257, and contact 261 selectively engages contact 251 or 255.

The numeral 268 denotes an autotransformer which has a tap 270. One terminal of that autotransformer is connected to pin 274 of plug 272, and also is connected to the confronting terminals of capacitors 290 and 292, to the anodes of Zener diodes 282 and 284, to the confronting terminals of capacitors 302 and 304, and to the cathodes of Zener diodes 312 and 314. A fuse 280 connects the other terminal of autotransformer 268 to pin 276 of plug 272; and that other terminal also is selectively connectable to the clockwise and counterclockwise terminals, respectively, of motor 196 by relay contacts 390 and 384 of relays 388 and 382. That other terminal also is selectively connectable to the clockwise and counterclockwise terminals, respectively, of motor 198 by relay contacts 350 and 356 of relays 348 and 354. The pin 278 of plug 272 will be grounded whenever that plug is seated in the socket 472 of FIG. 10.

Figure 11:
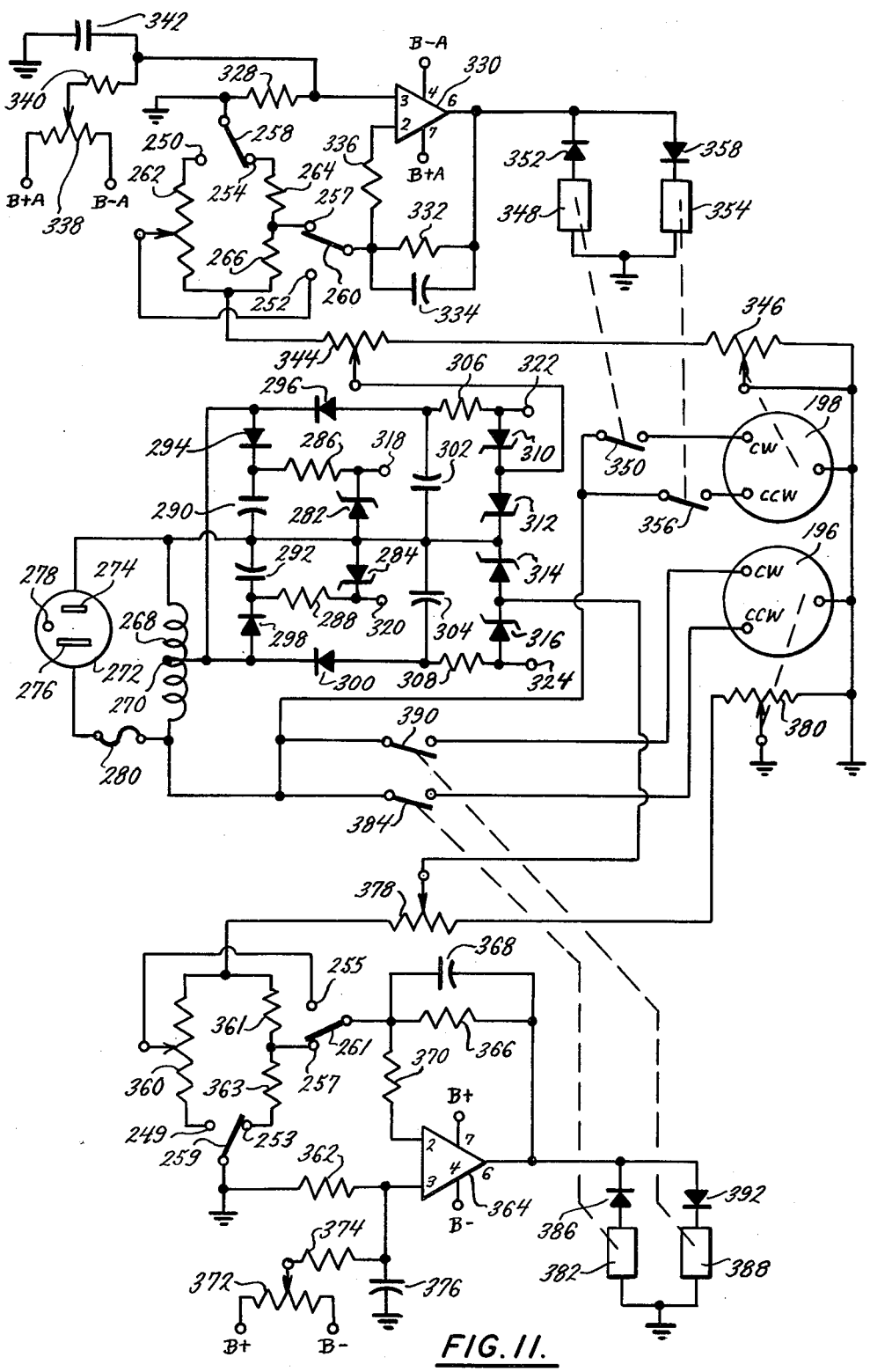
FIG. 11 is a schematic diagram of the rest of that circuit.

Diodes 294, 296, 298 and 300, resistors 286, 288, 306 and 308, and Zener diodes 310 and 316 coact with capacitors 290, 292, 302 and 304 and with Zener diodes 282, 284, 312 and 314 to constitute a power supply which receives twenty-six volts of alternating current from autotransformer 268 and which provides about 14-16 volts D.C. between B+A output terminal 318 and B−A output terminal 322 and also between B+ output terminal 320 and B− output terminal 324. Many different forms of power supply could be used, but the one shown in FIG. 11 is useful.

The numeral 262 denotes a potentiometer which is mounted adjacent the control, not shown, of console 236 that determines the fore-aft displacement of views on the console screen; and the movable contacts of that potentiometer and of that control will be interconnected so they will simultaneously respond to fore-aft movement of the control element 238. The numeral 360 denotes a potentiometer which is mounted adjacent the control, not shown, of console 236 that determines the port-starboard tilting of views on the video screen; and the movable contacts of that potentiometer and of that control will be interconnected so they will simultaneously respond to port-starboard movement of the control element 238.

Where the movable contacts of the controls of console 236 move linearly, the potentiometers 262 and 360 will be linear-type potentiometers. However, where the movable contacts of the controls of that console are rotated, the potentiometers 262 and 360 will be rotary potentiometers and the movable contacts thereof will be mounted on the same shafts on which the movable contacts of the controls of the console are mounted.

One end of potentiometer 262 is connected to contact 250, and the other end is connected to ground by series-connected potentiometers 344 and 346. The latter potentiometer is fixed to and movable with the platform 156 so the movable contact thereof will move whenever that platform tilts along its fore-aft axis. The movable contact of potentiometer 344 is connected to the junction between the cathode of Zener diode 310 and the anode of Zener diode 312 of the power supply. The movable contact of potentiometer 262 is connected to contact 252. Resistors 264 and 266 are connected in series between contact 254 and the lower terminal of potentiometer 262. The junction between those resistors is connected to contact 257.

One end of potentiometer 360 is connected to contact 249, and the other end is connected to ground by series-connected potentiometers 378 and 380. The latter potentiometer is secured to the platform 156 so the movable contact thereof will move whenever that platform tilts along its port-starboard axis. The movable contact of potentiometer 378 is connected to the junction between the cathode of Zener diode 316 and the anode of Zener diode 314 of the power supply. The movable contact of potentiometer 360 is connected to contact 255. Resistors 361 and 363 are connected in series between contact 253 and the upper terminal of potentiometer 360. The junction between those resistors is connected to contact 261. Potentiometers 346 and 380 have the movable contacts thereof grounded so they act as adjustable resistors.

Contact 258 is connected to ground. A resistor 328 has one end connected to ground and has the other end connected to the non-inverting input pin 3 of a differential amplifier 330 which has a feedback resistor 332 and a feedback capacitor 334 connected between output pin 6 and inverting input pin 2 via a resistor 336. Contact 260 selectively connects the movable contact of potentiometer 262 or the junction between resistors 264 and 266 to that inverting input pin via the resistor 336. Pin 4 of amplifier 330 is connected to B−A output 322; and pin 7 of that amplifier is connected to B+A output 318.

A potentiometer 338 has the terminals thereof connected between outputs 318 and 322 of the power supply; and it has its movable contact connected to the non-inverting input pin 3 of amplifier 330 by a resistor 340. A by-pass capacitor 342 is connected between the non-inverting input pin and ground.

A diode 352 and the relay 348 are connected between output pin 6 of differential amplifier 330 and ground; and a diode 358 and the relay 354 are connected between that output pin and ground. The diodes 352 and 358 are oppositely polarized so relay 348 will close normally-open contacts 350 whenever the voltage at the output pin 6 of amplifier 330 has one polarity, and so relay 354 will close normally-open contacts 356 whenever that voltage has the opposite polarity. The potentiometers 262, 338, 344 and 346, differential amplifier 330, diodes 352 and 358, relays 348 and 354, relay contacts 350 and 356, and motor 198 constitute a servo system which will respond to any movement of the control element 238 of console 236 in the fore-aft direction to cause cable 216 to tilt the platform 156 along its fore-aft axis.

Contact 259 is connected to ground. A resistor 362 has one end connected to ground and has the other end connected to the non-inverting input pin 3 of a differential amplifier 364 which has a feedback resistor 366 and a feedback capacitor 368 connected between output pin 6 and inverting input pin 2 via a resistor 370. Contact 261 selectively connects the movable contact of potentiometer 360 or the junction between resistors 361 and 363 to that inverting input pin via the resistor 370. Pin 4 of amplifier 364 is connected to B− output 324, and pin 7 of that amplifier is connected to B+ output 320.

A potentiometer 372 is connected between outputs 320 and 324 of the power supply; and a resistor 374 connects the movable contact of the potentiometer to the non-inverting input pin 3 of amplifier 364. A by-pass capacitor 376 is connected between that non-inverting input pin and ground.

A diode 386 and the relay 382 are connected between output pin 6 of amplifier 364 and ground; and a diode 392 and the relay 388 are connected between that output pin and ground. The diodes 386 and 392 are oppositely polarized so relay 382 will close normally-open contacts 384 whenever the voltage at output pin 6 has one polarity and so relay 388 will close normally-open contacts 390 whenever that voltage has the opposite polarity. The potentiometers 360, 372, 378 and 380, differential amplifier 364, relays 382 and 388, diodes 386 and 392, and motor 196 constitute a servo system which will respond to any movement of the control element 238 of console 236 in the port-starboard direction to cause drum 206 and cable 216 to tilt the platform 156 along its port-starboard axis.

The settings of the movable contacts of potentiometer 344 and 378 will be made at the factory. Those settings may be adjusted in the event a service call is ever needed, but will otherwise remain fixed; and those settings will cause the platform 156 to be horizontal along both its fore-aft and port-starboard axes whenever the control element 238 of console 236 is controlling the position of that platform and is in its "home" position. The values of resistors 264 and 266 are selected so motor 198 will cause the platform 156 to be level along its fore-aft axis whenever the contacts 258 and 254 are in engagement, contacts 260 and 275 are in engagement; and relay contacts 412, 417 and 427 are closed. Similarly, the values of resistors 361 and 363 are selected so motor 196 will cause that platform to be level along its port-starboard axis whenever the the contacts 259 and 253 are in engagement, contacts 261 and 251 are in engagement, and relay contacts 412, 417 and 427 are closed.

In the preferred embodiment of the present invention, all of the relays 246, 398, 408, 416, 420, 426, and 434 will be electronic relays. However, for clarity of showing, those relays are shown as electromagnetic relays with contacts.

Whenever the system of the present invention is at rest, the computer 245 will hold the relay 246 in an inactive state; and hence relay contacts 247 will be closed and movable relay contact 248 will be in its upper position. Switch 396 will be open; and hence relay 398 will be inactive and its contacts 400 and 402 will be open and its contact 404 will be in its lower position. Open relay contacts 402 will coact with open safety safety belt switch 406 to keep relay 408 inactive; and relay contact 404 will coact with open relay contacts 417 to keep the solenoids 131, 133, 135 and 137 de-energized—so the plungers thereof will lodge within the holes in the locking brackets 176, 178, 180 and 182 to lock the platform 156 against movement.

To use the system of the present invention, the user will move inwardly through the opening 232 or 234 in the upward extension 230 of the housing 224. If that housing is set so the top thereof is at floor level, the user can step directly through opening 232 or 234; but, if that housing is resting atop the floor, a single step or plural step stair will be secured to, or disposed immediately adjacent, one or both sides of that housing to enable the user to step up onto the closure 226 of that housing. Thereafter, the user will step onto the floor 194, sit down in the chair 240, and fasten the seat belt 242—with consequent closing of switch 406. Because relay contacts 402 are open, the closing of switch 406 will not, at that moment, energize relay coil 408. Thereafter, the user will insert a coin in the coin slot of the console 236, with consequent closing of switch 396, energization of relay coil 398, closing of relay contacts 400 and 402, and shifting of movable relay contact 404 to its upper position. Relay contacts 400 will coact with relay contacts 247 to establish a holding circuit for relay 398, relay contacts 402 will coact with previouslyclosed seat belt switch 406 to activate relay 408, and the shifting of relay contact 404 to its upper position will energize the solenoids 131, 133, 135 and 137—with consequent freeing of platform 156 for movement. The activation of relay 408 will close contacts 410, 412 and 414; and contacts 410 will activate time delay network 438, contacts 412 will connect computer 245 and socket 472 to conductor 243, and contacts 414 will activate relay 434—with consequent shifting of movable contact 258 into engagement with contact 250, shifting of movable contact 259 into engagement with contact 249, shifting of movable contact 260 into engagement with contact 252, and shifting of movable contact 261 into engagement with contact 255. Computer 245 and socket 472 will remain inactive throughout the time delay provided by time delay network 438; and hence the user will have enough time to read any instructions on the video screen, and also to make sure that the seat belt 242 fully, but comfortably, provides the support desired by the user. At the end of that time delay, relay 426 will close contacts 428 to activate the computer 245 of FIG. 10 and the servo systems of FIG. 11. Thereupon, that computer will cause a predetermined and variable succession of views to be displayed on the screen of console 236, and the user can manipulate the control element 238 of that console to (a) cause those views to shift up and down and/or to tilt from side-to-side and (b) initiate oppositely-directed tilting of platform 156.

The computer 245 is programmed to cause a predetermined and variable sequence of views to be displayed on the screen of console 238 and then follow that sequence by displaying a view which includes instructions for the next user. If desired, that view could also indicate that the preceding sequence of views has been concluded, could include text that was intended to induce additional users to use the system, or could include other desired pictorial or textual material. Throughout the time the computer is causing the predetermined and variable sequence of views to be displayed on the console screen, the user can manipulate the control element 238 of console 236 to cause any given view on the screen to move upwardly or downwardly or to tilt from side-toside on the console screen and also to cause the platform 156 to tilt oppositely of that view. Specifically, if the manipulation of control element 238 causes a view to move upwardly or downwardly on the screen, the corresponding movement of the movable contact of potentiometer 262 will apply an error signal to the inverting input of amplifier 330 which will cause motor 198 to be energized until the movable contact of potentiometer 346 is shifted to a position which reduces that error signal to zero. Thus, if that view was caused to move upwardly on the screen, the servo system at the top of FIG. 11 would cause the fore portion of platform 156 to move downwardly. However, if that view was caused to move downwardly, that servo system would cause the fore portion of that platform to move upwardly. If the manipulation of control element 238 causes a view to tilt on the screen, the corresponding movement of the movable contact of potentiometer 360 will apply an error signal to the inverting input of amplifier 364 which will cause motor 196 to be energized until the movable contact of potentiometer 380 is shifted to a position which reduces that error signal to zero. Thus, if that view was caused to tilt in the clockwise direction on the screen, the servo system at the bottom of FIG. 11 would cause the platform 156 to tilt in the counterclockwise direction. However, if that view was caused to tilt in the counterclockwise direction, that servo system would cause that platform to tilt in the clockwise direction. In addition, any movement of the control element 238 of console 236 which caused a composite movement of the view on the screen would cause the two servo systems of FIG. 11 to provide an oppositely-directed composite movement of platform 156. As a result, the sensation of movement which the user experiences as the view is moved on the screen will be enhanced and made quite realistic by the oppositely-directed movement of the platform.

In the preferred embodiment of the present invention, the maximum angular movement of the platform 156 along the fore-aft axis is thirty degrees from an angle of fifteen degrees below the horizontal to an angle of fifteen degrees above the horizontal. Similarly, the maximum angular movement of that platform along the port-starboard axis is thirty degrees from an angle displaced fifteen degrees below the horizontal to an angle displaced fifteen degrees above the horizontal. The fore-aft and the port-starboard movements of the view on the screen need not be limited to that angular extent; and hence, during a movement of the view on the screen to one of its limits of movement, that view may continue after platform 156 has reached the limit of its corresponding oppositely-directed movement. Also, the view on the screen may respond more quickly to movement of the control element 238 of console 236 than can the platform 156—because the speed-reduction ratios of the gears in the gear trains of motors 196 and 198 are selected so movement of the platform will be slow enough to avoid all possible injury to the user or to the system and also to keep from alarming even a timid user. However, the movement of platform 156 will give a significant and meaningful sensation of realism to the user as that platform moves oppositely of the view on the screen.

When computer 245 has caused the predetermined and variable sequence of views to be displayed on the screen of console 236, the program of that computer will automatically cause that computer to discontinue that sequence of views and to activate relay 246. Thereupon, relay contact 248 will move downwardly into its lower position to activate relay 416, and relay contacts 247 will simultaneously open to deenergize relay 398. The activation of relay 416 will close relay contacts 418 to pre-set a holding circuit for relay 416, will close relay contacts 419 to activate time delay network 432, will close relay contacts 425 and 427 to provide a holding circuit for socket 472, and will close relay contacts 417 to pre-set a holding circuit for the solenoids 131, 133, 135 and 137. Although the com- puter 245 is connected in parallel with the socket 472, that computer has an internal latch which will keep it from initiating a further predetermined and variable sequence of views on the screen of console 236 until the supply of power to that computer has been interrupted and then re-established.

When the opening of relay contacts 247 rendered relay 398 inactive, relay contacts 400 and 402 reopened, and the movement of relay contact 404 moved back down into its lower position. The reopening of relay contacts 400 will restore control of the activation of relay coil 398 to series-connected relay contacts 247 and coin-actuated switch 396. The reopening of relay contacts 402 will render relay 408 inactive; and the movement of relay contact 404 to its lower position will coact with the prior closing of relay contacts 417 to maintain the solenoids 131, 133, 135 and 137 energized. As a result, the platform 156 will be able to move even though computer 245 has completed its displaying of the predetermined and variable sequence of views on the screen of console 236.

The rendering of relay 408 inactive will permit reopening of relay contacts 410, 412 and 414. The reopening of relay contacts 410 will render time delay network 438 inactive, and thereby render relay 426 inactive—with consequent reopening of relay contacts 428. The reopening of those relay contacts will not be significant at this time because relay contacts 427 are being held closed by relay 416. The reopening of relay contacts 412 is not significant at this time because relay contacts 425 are being held closed by relay 416. However, the reopening of relay contacts 414 will be significant because it will render relay 434 inactive—with consequent shifting of contact 258 back into engagement with contact 254, shifting of contact 259 back into engagement with contact 253, shifting of contact 260 back into engagement with contact 257, and shifting of contact 261 back into engagement with contact 251. Thereupon, the servo systems will supply platform-centering signals to the inverting input pins 2 of amplifiers 330 and 364. If the platform 156 does not happen to be in its "home" position, the resulting error signals will cause those amplifiers to selectively activate various of relays 348, 354, 382 and 388, and thereby energize either or both of motors 198 and 196 until that platform reaches its "home" position. At that time the error signals supplied to the amplifiers 330 and 364 will be zero, and the servo systems of FIG. 11 will come to rest.

The activation of time delay network 432 resulted in immediate activation of relay 420 for a time period of about one and one-half to two seconds. The resulting closing of relay contacts 424 will coact with the closing of relay contacts 418 and the return of relay contact 248 to its upper position to keep relay 416 activated throughout the duration of that time period.

The movement of relay contact 248 to its lower position, and the opening of relay contacts 247, which will occur at the end of the predetermined and variable sequence of views displayed on the screen of console 236, will be only momentary—long enough to de-activate relay 398 and to activate relay 416. The return of relay contacts 247 to their closed position will not re-activate relay 398 because both coin-actuated switch 396 and relay contacts 400 will be open. The return of relay contact 248 to its upper position will coact with closed relay contacts 424 and 418 to keep relay 416 activated throughout the duration of the time delay provided by time delay network 432.

At the end of that time delay, relay 420 will become inactive with consequent reopening of relay contacts 424. Thereupon, relay 416 will become inactive with consequent reopening of relay contacts 417, 418, 419, 425 and 427. By this time, the servo systems of FIG. 11 will have restored the platform 156 to its "home" position, even if that platform had been tilted to one or the other of the extreme positions of both the fore-aft and portstarboard axes at the instant the predetermined and variable sequence of views on the console screen was concluded. This means that the holes in the locking brackets 176, 178, 180 and 182 will be in register with the plungers of the solenoids 131, 133, 135 and 137, respectively; and the deenergization of those solenoids as relay contacts 417 reopen will enable those plungers and locking brackets to again lock the platform in its "home" position. At this time, the system of the present invention will be in its "standby" position except for seat belt switch 406; and that switch will resume its normal position when the user opens the buckle of the seat belt.

In the foregoing description of the operation of the system, it was assumed that the user buckled the seat belt 242 before a coin was inserted in the coin slot on the console 236; but a coin could be inserted in that coin slot before that seat belt was buckled. In such event, the closing of coin-actuated switch 396 would activate relay 398 with consequent closing of relay contacts 400 and 402 and with consequent shifting of contact 404 up to its upper position. Thereafter, the buckling of the seat belt would close switch 406 with consequent activation of relay 408.

Importantly, whether seat belt switch 406 is closed before or after the coin-actuated switch 396 is closed, relay 408 will not be activated until both events have occurred. This means that until a user has inserted a coin of the proper denomination and also has buckled the seat belt 242, any movement of the control element 238 of console 236 can not effect any movement of platform 156.

The wrapping of portions of the length of cable 210 around the drum 206 and the wrapping of portions of the length of cable 216 around the drum therefor will keep the application of even heavy forces to portions of the periphery of platform 156 from causing tilting of that platform. As a result, the solenoids 131, 133, 135 and 137 and the locking brackets 176, 178, 180 and 182 are not absolutely indispensable; because a user of the system could step onto any portion of platform 156 without causing that platform to tilt. However, those solenoids and those locking brackets are desirable in freeing the cables 210 and 216 from all dynamic forces which could be applied to them as users stepped heavily onto the platform; and hence those solenoids and those locking brackets make certain that such forces could not cause any stretching of those cables even if those heavy forces were applied repeatedly over very long periods of time.

As shown particularly by FIG. 1, the opening 228 in the closure 226 for the housing 224 is elongated in the direction of the fore-aft axis of platform 156. In fact, that opening is elongated to such an extent in that direction that portions of the periphery of that platform are exposed adjacent the ends of that axis. However, the exposure of those portions could not constitute a hazard to the user of the system; because the console 236 would keep any portion of either shoe of the user from getting into position between the the fore portion of the periphery of platform 156 and the adjacent edge of opening 228, and the chair 240 would keep any portion of either shoe of the user from getting into position between the aft portion of the periphery of the platform and the adjacent edge of the opening 228.

It should also be noted from FIG. 1 that the side edges of opening 228 overlie the portions of platform 156 adjacent the ends of the port-starboard axis; and hence enable a user of the system to step onto that closure and platform safely and confidently. Further, the portions of platform 156 adjacent the ends of the port-starboard axis are positioned so far below the closure 226 of housing 224, whenever that platform is in its "home" position, that a user's shoe could not be pinched between the sides of the opening 228 in that closure and the underlying portions of that platform. Moreover, it should be noted that the closest edge of opening 228 is almost two feet away from a vertical plane which passes through the center of that chair and the center of console 236. As a result, even a very tall user of the system, who was seated in chair 240 with seat belt 242 buckled, would not be likely to have either of his feet in position beneath any part of the closure 226 of housing 224 while he was operating the system. However, even if a user were, somehow, to dispose either of his feet under a portion of that closure, that foot would not be pinched—even when the platform 156 reached its most extreme tilted position along the port-starboard axis; because there would be at least an inch clearance between the bottom surface of closure 226 and the uppermost point on the periphery of that platform.

If desired, a readily-flexible, bellows-like barrier could have the upper edge thereof secured to the edge of opening 228 and could have the lower edge thereof secured to the periphery of platform 156. Such a barrier would keep a user from getting any portion of either foot under any portion of closure 226.

In the preferred embodiment of the present invention, each of the cables 210 and 216 has both of its ends connected to the base 100, and drums for those cables rotate to shorten or lengthen the portions of the cables which extend between that base and platform 156. However, if desired, a rack and gear could be substituted for the drum 206, and a further rack and gear could be substituted for the drum which drives the cable 216. In such event, each of those cables would be cut into two pieces, and the inner ends of each cable would be secured to the opposite ends of one of the racks. Rotation of the gears would cause the racks to translate in the desired directions and thereby shorten the distances between portions of platform 156 and the base 100 and correspondingly lengthen the distances between diametrically-opposed portions of that platform and that base.

If desired, each of the cables 210 and 216 could have one end thereof fixedly secured to the drum therefor and could have the other end thereof extending over a pulley and then down to the base 100; and rotation of the drums could shorten the distances between the base 100 and the portions of the platform 156 to which those pulleys were secured. Coiled springs could extend between that base and diametrically-opposed portions of the platform 156 to apply downwardly-directed pulls to those diametrically-opposite portions. In such event, one of the drums and cables could be used to pull one portion of the platform downwardly toward the base and the spring at the diametrically-opposite portion of that platform would yield to permit upward movement of that diametrically-opposite portion. However, additional restorative forces would be developed within that spring during the upward movement of that diametrically-opposite portion; and hence that spring would be able to restore that diametrically-opposite portion to its normal horizontal position whenever the drum and cable permitted it to do so. In fact, that spring would be able to pull that diametrically-opposite portion downwardly about fifteen degrees below the horizontal whenever the drum and cable permitted it to do so. Such an arrangement would not be as desirable as that shown in the drawing, because heavier motors than the fractional-horsepower motors 196 and 198 would be needed to additionally stretch the normally-stretched springs. Also, recurrent greasing or lubricating of the racks and the guides therefor would be required.

Additionally, if desired, the cables 210 and 216 and the drums therefor could be completely replaced by rack and gear arrangements. In one such arrangement, a gear-equipped motor could be secured to the base 100 and a rack could be secured to either the fore portion or the aft portion of the platform 156, and a further rack and gear arrangement could be used to interconnect that base with the port or starboard portion of that platform. Activation of the motor for the rack and gear arrangement beneath the fore-aft axis of the platform would cause desired tilting of that platform along that axis; and activation of the motor beneath the port-starboard axis of that platform would provide desired tilting of that platform along that axis.

The components used in the circuit of the preferred embodiment of the present invention are:

| Component | Identification |
|---|---|
| Resistors 286, 288, 306, 308 | 300 ohms, 15 watts 5% |
| Resistors 340 and 374 | 100K - 2 watt - 5% |
| Resistors 328, 336, 362 and 370 | 2.7K - ½ watt - 5% |
| Resistors 332 and 366 | 270K - ½ watt - 5% |
| Resistors 264, 266, 361 and 363 | 500 ohms - 1 watt - 5% or better |
| Potentiometers 262 and 360 | Linear potentiometers - 1K - 1 watt - 5% or better |
| Potentiometers 346 and 380 | Linear potentiometers - 500 ohms - 1 watt - 5% or better |
| Potentiometers 338 and 372 | Linear potentiometers - 5K - 1 watt - 10% |
| Potentiometers 344 and 378 | Linear potentiometers - 100 ohms - 1 watt - 10% |
| Capacitors 290, 292, 302 and 304 | Electrolytic - 100 microfarads, 100 volts |
| Capacitors 334, 342, 368 and 376 | Ceramic - 1 microfarad - 200 volts |
| Diodes 294, 296, 298, 300, 352, 358, 386 and 392 | 100 PIV silicon |
| Zener diodes 282 and 284 | 14 volt Zener diodes - 1 watt - 5% or better |
| Zener diodes 312 and 314 | 6.2 volt Zener diodes - 1 watt - 5% or better |
| Zener diodes 310 and 316 | 8.2 volt Zener diodes - 1 watt - 5% or better |
| Relays 398, 408, 416 and 434 | solid state relays - 5 to 20 volt to activate |
| Amplifiers 330 and 364 | Texas Instruments SN7274IL operational amplifier |
| Fuse 280 | 3 ampere, 120 volt fuse |

Whereas the drawing and accompanying description have shown and described one preferred embodiment of the present invention, it should be apparent to those skilled in the art that various changes may be made in the form of the invention without affecting the scope thereof.

What we claim is:

1. A video controlling and viewing system which comprises a base unit that is intended to remain stationary throughout use of said system, a platform which is adapted to be moved during use of said system, mounting means intermediate said base and said platform to permit said platform to be moved relative to said base, a video screen mounted on and movable with said platform, control means operable by a user of said system to control movement of said platform and also to control movement of the view on said video screen, said platform having an area thereon wherein said user of said system can manipulate said control means while said platform simultaneously moves said video screen and said user of said system, and driving means to provide movement of said platform which, at least in part, occurs during movement of said view on said video screen, said driving means including a cable and a drum and a motor, said cable extending between said base and said platform and responding to rotation of said drum to cause tilting of said platform relative to said base, said motor being responsive to movement of said control means to drive said drum, said drive means responding to movement of said control means in a predetermined direction to cause said drum to rotate in a given direction and responding to movement of said control means in the opposite direction to cause said drum to rotate oppositely of said given direction.

2. A video controlling and viewing system as claimed in claim 1 wherein said cable extends between said base and said platform at two spaced points.

3. A video controlling and viewing system as claimed in claim 1 wherein said cable extends between said base and said platform adjacent one end of an axis of movement of said platform.

4. A video controlling and viewing system as claimed in claim 1 wherein said cable extends between said base and said platform adjacent one end of an axis of movement of said platform, and wherein said cable also extends between said base and said platform adjacent the opposite end of said axis of movement of said platform.

5. A video controlling and viewing system as claimed in claim 1 wherein said cable extends between said base and said platform adjacent one end of an axis of movement of said platform, wherein said driving means includes a further cable and a further drum and a further motor, wherein said further cable extends between said base and said platform and responds to rotation of said further drum to cause tilting of said platform relative to said base, wherein said further motor is responsive to movement of said control means to drive said further drum, wherein said drive means responds to movement of said control means in a direction angularly displaced from said predetermined direction to cause said further drum to rotate in a desired direction and responds to movement of said control means in a direction opposite to said angularly-displaced direction to cause said further drum to rotate oppositely of said desired direction.

6. A video controlling and viewing system as claimed in claim 1 wherein said cable extends between said base and said platform adjacent one end of an axis of movement of said platform, wherein said driving means includes a further cable and a further drum and a further motor, wherein said further cable extends between said base and said platform and responds to rotation of said further drum to cause tilting of said platform relative to said base, wherein said further motor is responsive to movement of said control means to drive said further drum, wherein said drive means responds to movement of said control means in a direction angularly displaced from said predetermined direction to cause said further drum to rotate in a desired direction and responds to movement of said control means in a direction opposite to said angularly-displaced direction to cause said further drum to rotate oppositely of said desired direction, wherein the first said cable extends between said base and said platform at two spaced points, and wherein said further cable extends between said base and said platform at two further spaced points.

7. A video controlling and viewing system as claimed in claim 1 wherein said cable extends between said base and said platform adjacent one end of an axis of movement of said platform, wherein said driving means includes a further cable and a further drum and a further motor, wherein said further cable extends between said base and said platform and responds to rotation of said further drum to cause tilting of said platform relative to said base, wherein said further motor is responsive to movement of said control means to drive said further drum, wherein said drive means responds to movement of said control means in a direction angularly displaced from said predetermined direction to cause said further drum to rotate in a desired direction and responds to movement of said control means in a direction opposite to said angularly-displaced direction to cause said further drum to rotate oppositely of said desired direction, wherein the first cable extends between said base and said platform adjacent one end of one axis of movement of said platform, and wherein said further cable extends between said base and said platform adjacent one end of a further axis of movement of said platform which is angularly displaced from said one axis of movement of said platform.

8. A video controlling and viewing system as claimed in claim 1 wherein said cable extends between said base and said platform adjacent one end of an axis of movement of said platform, wherein said driving means includes a further cable and a further drum and a further motor, wherein said further cable extends between said base and said platform and responds to rotation of said further drum to cause tilting of said platform relative to said base, wherein said further motor is responsive to movement of said control means to drive said further drum, wherein said drive means responds to movement of said control means in a direction angularly displaced from said predetermined direction to cause said further drum to rotate in a desired direction and responds to movement of said control means in a direction opposite to said angularly-displaced direction to cause said further drum to rotate oppositely of said desired direction, wherein the first said cable extends between said base and said platform adjacent one end of one axis of movement of said platform, wherein said further cable extends between said base and said platform adjacent one end of a further axis of movement of said platform which is angularly displaced from said one axis of movement of said platform, wherein said first said cable also extends between said base and said platform adjacent the opposite end of said one axis of movement of said platform, and wherein said further cable also extends between said base and said platform adjacent the opposite end of said further axis of movement of said platform.

9. A video controlling and viewing system as claimed in claim 1 wherein several turns of said cable encircle and engage said drum to keep the application of a force to said platform from causing a movement of said platform which could rotate about said drum.

10. A video controlling and viewing system as claimed in claim 1 wherein said cable extends between said base and said platform adjacent one end of an axis of movement of said platform, wherein said driving means includes a further cable and a further drum and a further motor, wherein said further cable extends between said base and said platform and responds to rotation of said further drum to cause tilting of said platform relative to said base, wherein said further motor is responsive to movement of said control means to drive said further drum, wherein said drive means responds to movement of said control means in a direction angularly displaced from said predetermined direction to cause said further drum to rotate in a desired direction and responds to movement of said control means in a direction opposite to said angularly-displaced direction to cause said further drum to rotate oppositely of said desired direction, wherein several turns of the first said cable encircle and engage the first said drum to keep the application of a force to said platform from causing a movement of said platform which could rotate said first said drum, and wherein said further cable encircles and engages said further drum to keep the application of a force to said platform from causing a movement of said platform which could rotate said further drum.

11. A video controlling and viewing system which comprises a base that is intended to remain stationary throughout use of said system, a platform which is adapted to be moved during use of said system, mounting means intermediate said base and said platform to permit said platform to be moved relative to said base, a video screen mounted on and movable with said platform, control means operable by a user of said system to control movement of said platform and also to control movement of the view on said video screen, said platform having an area thereon wherein said user of said system can manipulate said control means while said platform simultaneously moves said video screen and said user of said system, driving means to provide movement of said platform which, at least in part, occurs during movement of said view on said video screen, said platform having a "home" position, said system providing views on said video screen, said control means being operable to control movement of said platform while said views are are provided on said video screen, and homing means that automatically causes said driving means to move said platform to said "home" position after said system concludes the displaying of said views on said video screen.

12. A video controlling and viewing system as claimed in claim 11 wherein said homing means automatically causes said driving means to move said platform to said "home" position after said system concludes the displaying of said views on said video screen regardless of any manipulation of said control means by said user of said system.

13. A video controlling and viewing system as claimed in claim 11 wherein said housing means can not control said driving means while said system is providing said views on said video screen, and wherein said control means controls said driving means only while said system is providing said views on said video screen.

14. A video controlling and viewing system as claimed in claim 11 wherein said homing means automatically causes said driving means to move said platform to said "home" position before the initiation of a further sequence of views on said video screen, whereby said platform is in said "home" position at the beginning of each sequence of views on said video screen.

15. A video controlling and viewing system which comprises a base that is intended to remain stationary throughout use of said system, a platform which is adapted to be moved during use of said system, mounting means intermediate said base and said platform to permit said platform to be moved relative to said base, a video screen mounted on and movable with said platform, control means operable by a user of said system to control movement of said platform and also to control movement of the view on said video screen, said platform having an area thereon wherein said user of said system can manipulate said control means while said platform simultaneously moves said video screen and said user of said system, driving means to provide movement of said platform which, at least in part, occurs during movement of said view on said video screen, said system providing views on said video screen, locking means adapted to lock said platform against movement relative to said base prior to the beginning of each sequence of views on said video screen, and locking control means that holds said locking means in platform-freeing position while said views are provided on said video screen and for a short time thereafter.

16. A video controlling and viewing system as claimed in claim 15 wherein said platform has a "home" position, wherein homing means automatically causes said driving means to move said platform to said "home" position after each said sequence of views on said video screen, and wherein said short time is long enough to enable said homing means to move said platform to said "home" position while said locking control means holds said locking means in platform-freeing position.

17. A video controlling and viewing system as claimed in claim 15 wherein said locking means and said mounting means fully support said platform in locked position during the periods of time when the user of said system is stepping onto or off of said platform.

18. A video controlling and viewing system as claimed in claim 15 wherein said locking means are disposed close to the periphery of said platform to engage said platform adjacent said periphery thereof, said locking means coacting with said mounting means to fully support said platform in locked position.

19. A video controlling and viewing system which comprises a base that is intended to remain stationary throughout use of said system, a platform which is adapted to be moved during use of said system, mounting means intermediate said base and said platform to permit said platform to be moved relative to said base, a video screen mounted on and movable with said platform, control means operable by a user of said system to control movement of said platform and also to control movement of the view on said video screen, said platform having an area thereon wherein said user of said system can manipulate said control means while said platform simultaneously moves said video screen and said user of said system, driving means to provide movement of said platform which, at least in part, occurs during movement of said view on said video screen, and a housing which encloses said base and said platform and said mounting means, said housing having an opening in the top thereof which is, at least in part, coextensive with said platform, and said platform being spaced far enough below said top of said housing to enable said platform to be moved without striking said top of said housing.

20. A video controlling and viewing system as claimed in claim 19 wherein said video screen extends upwardly through, and is movable relative to, said opening in said top of said housing.

21. A video controlling and viewing system as claimed in claim 19 wherein the feet of said user of said system are below the level of said top of said housing, and wherein most of the person of said user of said system is above said level of said top of said housing.

22. A video controlling and viewing system as claimed in claim 19 wherein an enclosure extends upwardly from said housing to substantially enclose said video screen, wherein said user of said system to can manipulate said control means while said platform simultaneously moves said video screen and said user of said system, and wherein said enclosure has an opening therethrough adjacent said area to enable said user to directly enter or leave said area.

23. A video controlling and viewing system which comprises a base that is intended to remain stationary throughout use of said system, a platform which is adapted to be moved during use of said system, mounting means intermediate said base and said platform to permit said platform to be moved relative to said base, a video screen mounted on and movable with said platform, a programmed means to cause a predetermined and variable sequence of views to be displayed on said video screen, control means operable by a user of said system to control movement of said platform and also to control movement of any given view, of said predetermined and variable sequence of views on said video screen, relative to said video screen, said platform having an area thereon wherein said user of said system can manipulate said control means while said platform simultaneously moves said video screen and said user of said system, and driving means to provide movement of said platform which, at least in part, occurs during movement of said given view on said video screen, said programming means being independent of said control means and of said driving means to the extent that said programming means will cause said predetermined and variable sequence of views to be displayed on said video screen irrespective of any and all actions of said control means and of said driving means but being related to said control means to the extent that any or all views of said predetermined and variable sequence of views on said video screen can be moved relative to said video screen, said control means and said driving means being independent of said programming means to the extent that neither said control means nor said driving means need be actuated to effect the display on said video screen of said predetermined and variable sequence of views but being related to said programming means to the extent that actuation of said control means and of said driving means can produce movements of said platform relative to said video screen and can produce movements of any or all views of said predetermined and variable sequence of views on said video screen relative to said video screen which will add a sense of realism to the viewing of said predetermined and variable sequence of views on said video screen.

24. A video controlling and viewing system which comprises a base that is intended to remain stationary throughout use of said system, a platform which is adapted to be moved during use of said system, mounting means intermediate said base and said platform to permit said platform to be moved relative to said base, a video screen mounted on and movable with said platform, a chair, control means operable by a user of said system to control movement of said platform and also to control movement of the view on said video screen, driving means to provide movement of said platform which, at least in part, occurs during movement of said view on said video screen, said system providing views on said video screen, locking means adapted to lock said platform against movement relative to said base prior to the beginning of each sequence of views on said video screen, locking control means that holds said locking means in platform-freeing position while said views are provided on said video screen and for a short time thereafter, a seat belt which can hold the user of said system whenever said user is seated in said chair, a switch responsive to the buckled or un-buckled state of said seat belt, a coin-actuated switch, and circuit means that prevents the beginning of any sequence of views on said video screen and also prevents any activation of said driving means until both said switch and said coin-actuated switch have been actuated.

25. A video controlling and viewing system as claimed in claim 19 wherein some opening-defining portions of said top overlie portions of the periphery of said platform to enable a user of said system to step on said closure and then step onto said platform.

* * * * *